Dec. 23, 1969    B. PERREN    3,485,262

AUTOMATIC SAFETY DEVICE FOR TANKS

Filed May 19, 1967

INVENTOR.

Benno Perren

BY

Watson, Cole, Grindle & Watson
Attys.

United States Patent Office 3,485,262
Patented Dec. 23, 1969

3,485,262
AUTOMATIC SAFETY DEVICE FOR TANKS
Benno Perren, Wettingen, Switzerland, assignor to
Hectronic AG, Aarau, Switzerland
Filed May 19, 1967, Ser. No. 639,900
Claims priority, application Austria, May 20, 1966,
A 4,807/66
Int. Cl. F16k 21/18; G08b 29/00; G01l 7/22
U.S. Cl. 137—386   6 Claims

ABSTRACT OF THE DISCLOSURE

An automatic safety system and mechanism for guarding against the overfilling of tanks from a tank truck as to fluids and operative as to the liquid level in the tank to be filled.

---

Figure 1:
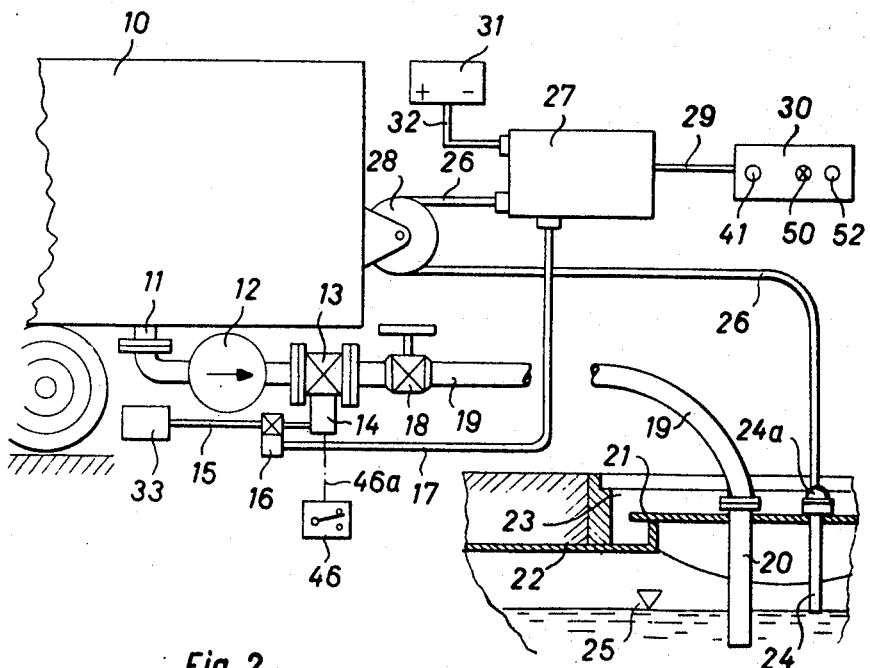

The present invention relates to an automatic safety system guarding against the overfilling of tank installations as to a fluid.

Safety systems of this type and for this purpose are everywhere necessary, where a person for a permanent visual survey of the liquid level in a filling tank is not available, or where such visual survey is difficult or impossible due to the location of the tank or for other reasons.

Safety or alarm devices have been used heretofore in which liquid levels were determined by floats in the tank which, when rising upon the rise of the liquid level, were operatively connected by mechanical means to a stop-cock or the like in the filling line. Recently also photo-electric devices were used to indicate the liquid level in a tank. In such a case, it is necessary to provide a stop-cock or the like in the filling line or hose which is spring biased to be normally closed, is opened only when an electric circuit is energized under the control of the photo-electric device, as long as the tank is not full.

The known safety systems and particularly mechanical devices, suffer from a number of drawbacks caused by the fluid handled, corrosion or fouling by foreign matter contained in the fluid and resulting in an inaccurate and unreliable operation of known devices.

It is essential for a reliable safety system to consider a series of problems which present themselves. Such the safety system should offer, the possibility to be adapted and used easily in connection with existing tank trucks and tank installations without the need of considerable changes as to said trucks and installations. Also it is necessary in any good safety system that the stop-cock for the filling line shall remain closed and shall automatically close when any disturbance as to the normal operation occurs, and that in such cases, the system produces an alarm.

A reliable safety alarm system against over-filling should further offer the possibility of readily checking its safety operation against over-filling, even during the normal filling of a tank.

The invention has for its main object to obviate the drawbacks of safety devices in use heretofore. It is therefore a further object of the invention to provide a safety system in which the tank to be filled is provided with a photo-electric device which will sense the fluid level in the tank to be filled and a filling line from a tank truck to the tank to be filled having a stop-cock or the like which is spring biased to automatically close and is opened only upon the closing of an electrical circuit in function with the photo-electric device as long as the tank is not full. The novel feature of the invention resides essentially in electrical power reducing means in the power supply circuit of a light source of the photo-electric device said means being operable to check the safety operation of the system and thereby reduce the light emission of the light source from a nominal value down below a predetermined threshold value which causes the stop-cock to close automatically when the system is in good operating condition.

In an advantageous embodiment of the safety system according to the invention, the electrical circuit means comprise a check switch which can be operated manually as well as an automatic check switch that is periodically operated by time operating mechanism. In order to limit each checking of the operation of the safety system to a time interval just sufficiently to see that the operation of the system is correct, that is until the stop-cock starts its closing movement, the stop-cock is in operative connection with an electrical switch which will be automatically operative as soon as the stop-cock begins to move out of its open position and which switch upon its actuation brings back the light emission from the light source up to the nominal value. The latter switch means can constitute a component of the time switch mechanism and control the beginning of the periods for the periodic operation of the automatic check switch, that is, to bring the time switch mechanism to its starting point position.

Also advantageously the power supply circuit for the light source can comprise a series resistor to reduce the light emission, the manual and the automatic control switches being closed in their position of rest and being arranged in a circuit which is normally bridging the series resistor.

Figure 2:
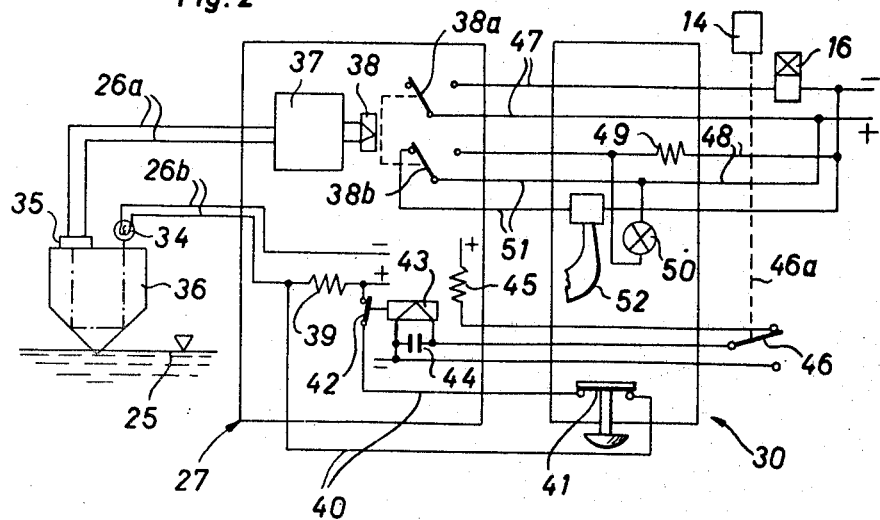

Further objects will be apparent from the following description when considered in connection with the accompanying drawing in which;

FIGURE 1 is a diagrammatic view partly in section showing the safety system according to the invention in its entire arrangement, and FIGURE 2 is a wiring diagram showing the electrical circuits of the safety system.

FIG. 1 shows a container 10 of the tank truck having thereunder a connecting pipe 11 and a pump 12 to which is connected an automatic slide 13 functioning as a stop-cock or the like. The pump 12 is of a type that may continue to rotate without damage or considerably increasing the output pressure when the slide 13 is closed. The slide 13 may be provided with a built-in biasing spring, not shown, to automatically move the slide to a closed position and a pneumatic cylinder and piston unit 14 serves to open the slide by a pressure medium. Such pressure medium, as for example, compressed air, may be supplied through a pipe 15 having a magnetic valve 16 connected to an electric control line 17. The magnetic valve 16 has a vent passage which opens into the atmosphere and allows venting off the pneumatic unit 14 when the pressure air pipe 15 is closed by the magnetic valve 16.

A manually operable closure valve 18 is connected to the automatic slide 13 and to a flexible draw-off line 19 which is removably connected to a filling connection or socket 20. The latter passes through a dome 21 of a buried and accessible tank 22 by a hollow depression or pit 23.

Near the filling connection 20 there is also mounted in the dome 21, a fluid level detector 24 which is for the purpose of indicating when the fluid in the tank 22 has risen or reached the level 25. The fluid level detector 24 operates on the photo-electric principle and is, for example, so constructed as in accordance with and as described in the Switzerland Patent No. 404,224.

A plug or outlet 24a on the dome 21 connects the fluid level detector 24 with an electric cable installation 26 which latter leads to a control unit 27 to which also the control line 17 of the magnetic valve 16 is connected. The cable line 26 can be drawn from a drum 28 on the tank truck 10 to the length required. An electric cable 29 is connected to a signal and operating box or device 30 from the control unit 27.

A battery 31 is provided to furnish electrical energy for the system and this battery is connected to the control unit by means of the cable 32. The compressed air pipe 15 is connected to compressed air container 33. The battery 31 and the compressed air container 33 can be components already existing on the tank truck.

Further details of the control unit 27, the signal operating box 30 and the electrical circuits may be taken from the circuit diagram according to FIG. 2, given by way of example.

The fluid level detector 24, FIG. 1, may, according to FIG. 2, comprise an electric light source or bulb 34 and a photo-electric transducer 35, for example, a photo-electric cell or a photo-sensitive resistor. The light rays from the light source 34 will be projected into a light permeable transparent body or member 36 which has, two totally reflecting surfaces on which the light will be reflected and finally will be directed into the photo-sensitive resistor 35 as long as the fluid in the tank 22 does not contact the body member 36.

The photo-sensitive resistor 35 is connected to the input of an amplifier 37 by means of a pair of wires 26a of the cable 26. The output of the amplifier 37 is connected to a relay 38 having an operating contact switch 38a and a change-over contact switch 38b.

A pair of wires 26b of the cable 26 serves the purpose of feeding power to the light source 34 from the battery 31. In one of the wires 26b there is provided an electrical resistor 39 which normally is bridged by a circuit 40. This circuit 40 includes a manually operable circuit breaker 41 and a further switch 42 which is automatically operable by a time relay 43. The relay 43 has a condenser 44 connected thereto in parallel which is loaded through a time relay resistor 45 and a change-over switch 46 when the latter is in the position as shown. In the other position of the switch 46, the condenser will be short circuited and discharged. The switch 46 is operatively connected by a ram or rod 46a to the piston of the cylinder and piston unit 14 in order to be operated together with the slide 13, and will take the position indicated only when the slide 13 is completely open.

The switch 38a is in a circuit 47 in which the magnetic valve 16 is connected. In a circuit 48 there is connected a resistor 49 and a signal lamp 50 in series. The lamp 50 is bridged by the switch 38b when the relay 38 is excited and the switch 38b is turned out of the position shown in FIG. 2. In the other position shown in the drawing, when relay 38 is released, the switch 38b will close a circuit 51 in which a signal horn 52 is connected. The signal horn 52 as also the circuit breaker 41, are mounted in the signal and operating box 30.

The use and operation of the described safety system is as follows:

It is to be assumed that all circuits, lines and elements are connected according to FIG. 1 and the storage tank 22 is to be filled with fluid from the tank truck 10. For this purpose one connects the battery 31 to the control unit 27. Since the light from the light source 34 is projected on the photo-sensitive resistor 35, a current flow will take place in the circuit 26a, which results in energizing the relay 38 at the output of the amplifier 37. The operating contact or switch 38a is therefore actuated and will close the circuit 47 and the contact or switch 38b is likewise actuated. Upon closing of the circuit 47, the magnetic valve 16 will be operated so that compressed air from the container 33 will stream into the cylinder and piston unit 14 to thereby open the slide 13. If one now opens the manual valve 18, the fluid will flow under the action of the pump 12 and then, due to gravity, flow into the filling line 19 and then into the tank 22.

The signal lamp 50 in the circuit 48 will not be energized or burn since it is bridged by the switch 38b and the total amount of electrical energy flowing in the circuit 48 is consumed by the resistor 49. The light source 34 of the fluid level detector 24 is fed with the total supply voltage, since the resistor 39 is bridged by the circuit 40. The light rays from the light source 34, after total reflections on the outer surface of the transparent body 36, will be directed with maximum intensity onto the photo-electric cell or photo-sensitive resistor 35.

As soon as the level of the fluid in the tank 22 reaches the transparent body 36 of the fluid level detector 24, the wetted outer surface portions of the body 36 will lose their total reflecting characteristics, so that the greater part of the light from the source 34 will leak off the body 36 and there will result a weaker light ray being received in the photo-electric cell or photo-sensitive resistor 35. This change of the received light intensity will result in a change of the resistance value of the photo-electric cell or photo-sensitive resistor 35. As soon as the change of the light intensity exceeds a predetermined threshold value, the output energy of the amplifier 37 is no longer sufficient to energize the relay 38. The latter will be released so that the switch 38a and the switch 38b will change to the positions according to FIG. 2.

By means of the switch 38a the circuit 47 of the magnetic valve 16 will be broken. Consequently, the compressed air pressure pipe 15 will be closed as to the unit 14 and the latter will be vented into the atmosphere through the valve 16; thereby, the slide 13 will be automatically closed by its biasing spring and thereby the line 19 will be shut off. The filling of fluid from the tank truck 10 into the storage tank 22 is interrupted. The pump 12 may continue to rotate without any damage.

By the operation of the switch 38b, the previous bridging over of the signal lamp 50 will be opened and thus the signal lamp will be brought into the circuit which will produce a permanent optical alarm. Simultaneously the circuit 51 will be closed by the switch 38b and the signal horn 52 which is in this circuit will be energized to produce an acoustic alarm. The two alarm signals 50 and 52 will indicate, in the manner described, that the storage tank 22 is full. Thereafter, the stuff will stop the pump 12 and close the valve 18.

In normal use a periodic automatic checking and a voluntary or optical checking possibility for the function of the safety system will be of utmost advantage and benefit. This checking will take place, for example, as follows:

When one operates the circuit breaker 41 manually, the resistor 39 is no longer bridged and it functions as a series resistor in the power supply circuit of the light source 34 and reduces its light emission from its nominal value so far that actually the before-mentioned threshold value of the light intensity will be reached at the photo-sensitive resistor 34 whereby the heretofore described actuation of the switches 38a and 38b by means of the amplifier 37 and the relay 38 will take place. Thus the described procedure will occur as if the fluid level had reached the fluid level detector 24. As soon as the signal lamp 50 lights up and the signal horn 52 sounds, one will have the assurance that the phase-electric part and the purely electrical elements of the safety system will function correctly, whereupon one releases the switch 41, then the normal operational functions will start again and the slide 13 will return in its fully opened position.

However, in order that such a checking would not be omitted as a result of forgetfulness and also that it would be carried out periodically during the fill-up operation, the switch 42 has additionally been included into the circuit 40, which has the same effect as the manually operable circuit breaker 41, except for the fact that it is periodically and automatically opened and closed, which operation is taken care of at certain time intervals by way of the timer relay 43. When the slide 13 is completely open, the change-over switch 46 has the position as shown in FIG. 2. The condenser 44 is then slowly charged through the resistor 45 and the closed contact of the change-over switch 46. If the potential at the condenser 44 has reached the operating voltage of the relay 43, in about 5 seconds for example, then the relay 43 is energized and, as a result thereof, the switch 42 is opened. The effect is the same as for the manual operation of the circuit breaker 41 as described. If subsequently the slide 13 is induced by means of the relay switch 38a, the magnetic valve 16 and the pneumatic unit 14 to close up the change-over switch 46, will be operated by the ram or rod connection 46a as soon as the slide 13 begins to move from its fully opened position toward its closed position. At this moment the change-over switch 46 will bridge the condenser 44, so that the latter will be discharged and the relay 43 de-energized. With that the switch 42 will return to its closed position, whereby the source of light 34 will again receive the full supply voltage and the before reduced emission of light is again increased to the nominal value. Thereafter, the circuit 47 is closed by means of the change-over switch 38a of the relay 38, as a result of which the slide 13 is again allowed to open completely and the signal lamp 50 and horn 52 are switched off. When the slide 13 is fully open, the switch 46 takes again its position as shown in FIG. 2. Thereafter begins a new cycle with identical functions as described. The checking process, therefore, takes place automatically periodically, whereby each time a short signal is given by the horn 52 and the lamp 50 which confirm the correct functioning of the safety system.

The resistance value of the resistor 39 must be selected depending on the design of the fluid level detector 24 and the optical refractive index of the fluid, in order to be able to bring about such a degree of the reduction of the light intensity, which on the one hand is smaller than the reduction of the light intensity at the photosensitive resistor 35 upon contact of the body 36 with the liquid but which, on the other hand, suffices to bring about the operation of the relay 38 when the circuit 40 is broken. In this manner, complete assurance for the functioning of the safety system will be guaranteed. As information for orientation, it may be mentioned here that the reduction of the luminous flux falling on the photo-electric cell or photo-sensitive resistor 35 in the case of wetting of the transparent body 36 with water amounts to about 70%, in the case of wetting with fuel oil about 96% and with gasoline more than 99%.

The light source 34 and the photo-electric cell or photo-sensitive resistor 35 of the fluid level detector 24, for practical purposes, are surrounded by a mass of cast resin, as a result of which a considerable insensitiveness to vibrations and shock in operation will be achieved. It will be advantageous to provide a built-in temperature compensator (not shown), which will permit the utilization of the fluid level detector 24 within a temperature range of from −20 degrees to +60 degrees C. Due to the particular optical system, the fluid level detector 24 is insensitive to condensed water.

The change-over switch 46 has been arranged in such a manner that the piston of the pneumatic unit 14, operating the slide 13, only executes a small stroke, until the change-over of the switch 46 takes place by means of the rod 46a, so that the slide 13 will move each time only a little from the fully opened position toward the closed position during the periodic automatic checking of the safety system. Thus, the periodic checking will not cause an essential reduction of the quantity of flow per time unit during the process of filling up. The slide 13, for practical purposes, will have a piston guided in a cylinder (not shown), which in the middle tapers considerably in the shape of a parabola and which is positioned at right angles to the direction of the flow of the liquid. Whenever the piston is moved, it will lock or open the bore holes in the cylinder through which the liquid must flow. Such a piston will shut-off the liquid smoothly, whereby the duration of closure may be, for example, between 0.5 and more than 1 second. Naturally, one can also use diaphragm valves, engine control slides, etc., if a practical answer-back signal is provided as represented by contact 46.

Instead of the electric-mechanical relays 38 and 43 as shown in FIG. 2, as well as the switches 38a, 38b and 42, there may be electronic switches formed by semiconductor constructional elements. At the same time, it may be advantageous to combine the switches 38a and 38b with the amplifier 37. In case it is desired, an electronic multivibrator may be provided instead of the time switch mechanism 43 to 46, which has been described and shown.

The safety system can easily be mounted on existing tank trucks, because the container 33 for compressed air and the battery 31 are already part of the equipment. In the tank installation of the party who is to be supplied, it will merely be necessary, first of all, to install the fluid level detector 24 in the tank, whereupon the detector 24 will merely be connected with the plug 24a prior to every filling operation. Wherever such a fluid level detector has not as yet been installed, the possibility would at least have to be there, to introduce such a detector into the tank and to attach it at the desired level of the liquid.

The safety system presented in the drawing and described with reference to the drawing has been developed in such a manner that any imaginable disturbance would immediately lead to automatic closure of the slide 13 and that it can be discovered by the checking processes described. Thus the slide 13 cannot move into the opened position or it will immediately assume its closing position, whenever anyone of the subsequently enumerated disturbances occurs, as follows:

(a) No battery voltage available, short circuit or interruption in the cable 32;

(b) No compressed air in the compressed air tube 15 or only compressed air with insufficient pressure;

(c) The fluid level detector 24 has not been connected;

(d) In the connecting cable 26 of the fluid level detector 24, there is an interruption or break or a short circuit or a ground contact;

(e) In the fluid level detector 24, a constructional element is defective, for example, the source of light 34 or the photo-electric cell or photo-sensitive resistor 35;

(f) The control unit 37 is defective;

(g) The electric control line 17, leading to the magnetic valve 16, has a short circuit or a break;

(h) The position of the slide 13 does not correspond to the output signal of the control unit 37; and (i) The safety system is not switched on.

The safety system according to the invention, which has just been described, results in an excellent safeguarding against over-filling of a tank installation or of a tank truck with a liquid. It relieves the personnel during their work and it prevents damage with liquids which otherwise can only be rectified by time-consuming and expensive cleaning work. The invention thus also contributes to the prevention of accidents and to the prevention of pollution of waters.

I claim:

1. Automatic safety system against the overfilling of a tank installation with a fluid, comprising a photo-electric fluid level detector mounted in the tank that is to be filled, said fluid level detector comprising an electric light source, a power supply circuit for said light source and a photo-electric transducer for receiving light emitted by said light source, the fluid level detector being arranged so that the fluid in the tank to be filled prevents at least a portion of the light emitted by said light source from falling on said photo-electric transducer when the fluid reaches a predetermined level in the tank, a filling line removably connected to the tank to be filled, stop-cock means in connection with said filling line and having biasing means which normally tend to move said stop-cock means in a closed position, driving means operatively connected to said stop-cock means for moving same in an opened position, electrical control circuit means interconnected between said photo-electric transducer and said driving means for controlling said driver means so that the stop-cock means is automatically moved in the opened position when the photo-electric transducer receives full light-intensity and automatically allowed to move in the closed position under the influence of said biasing means when the fluid in the tank reaches said predetermined level and thereby the light intensity received by the photo-electric transducer is reduced, electrical power reducing means provided in the power supply circuit of said light source for causing a reduction of the light emission of said light source from a nominal value down below a predetermined threshold value whereby the light intensity received by said photo-electric transducer is reduced to such an extent that the stop-cock means is automatically caused to move in the closed position, and switch means for bringing said power reducing means optionally in an inoperative condition for normal operation of the safety system and in an operative condition for checking the correct function of the safety system.

2. Automatic safety system according to claim 1, in which the electric control circuit means comprise optical and accoustical signal means actuated when the light intensity received by the photo-electric transducer is reduced.

3. Automatic safety system according to claim 1, in which the switch means comprise a manually operated checking switch and an automatic checking switch operated periodically by a timing mechanism, the stop-cock means being in operative connection with a component of the timing mechanism for resetting the timing mechanism to zero and for restoring the full light emission of the light source each time after the stop-cock means has begun to move toward the closed position.

4. Automatic safety system according to claim 1, in which the switch means comprises a manually operated checking switch and an automatic checking switch operated periodically by a timing mechanism, the stop-cock means being in operative connection with a component of the timing mechanism for resetting the timing mechanism to zero and for restoring the full light emission of the light source each time after the stop-cock means has begun to move toward the closed position, the power reducing means being a series resistor in the power supply circuit of the light source, and the manually operated checking switch and the automatic checking switch having normally closed contacts lying in series in an electric circuit which bridges said resistor.

5. Automatic safety system according to claim 1, in which the driving means for moving the stop-cock means in the opened position comprise a piston and cylinder unit which is operable by a pressure medium conducted through a pressure medium pipe from a pressure medium source to the piston and cylinder unit, said driving means further comprising magnetic valve means interconnected between said pressure source and said piston and cylinder unit for controlling a pressure medium flow to and from said piston and cylinder unit, and the magnetic valve means being connected to the electrical control circuit means.

6. Automatic safety system according to claim 1, in which the fluid level detector is permanently installed in the tank that is to be filled, the other parts of the safety system being mounted on a tank truck.

References Cited

UNITED STATES PATENTS

| | | |
|---|---|---|
| 2,621,240 | 12/1952 | Kemper. |
| 2,727,997 | 12/1955 | Schofield. |
| 3,143,161 | 8/1964 | Graves et al. |
| 3,311,834 | 3/1967 | Barker _____ 137—392 X |
| 3,384,885 | 5/1968 | Forbush _____ 340—380 X |

WILLIAM F. O'DEA, Primary Examiner

DAVID R. MATTHEWS, Assistant Examiner

U.S. Cl. X.R.

73—304; 137—392; 250—218; 317—124; 318—482; 340—410